May 28, 1940.  E. BUGATTI  2,202,753
COUPLING APPARATUS FOR VEHICLES
Filed Nov. 22, 1937  3 Sheets-Sheet 3

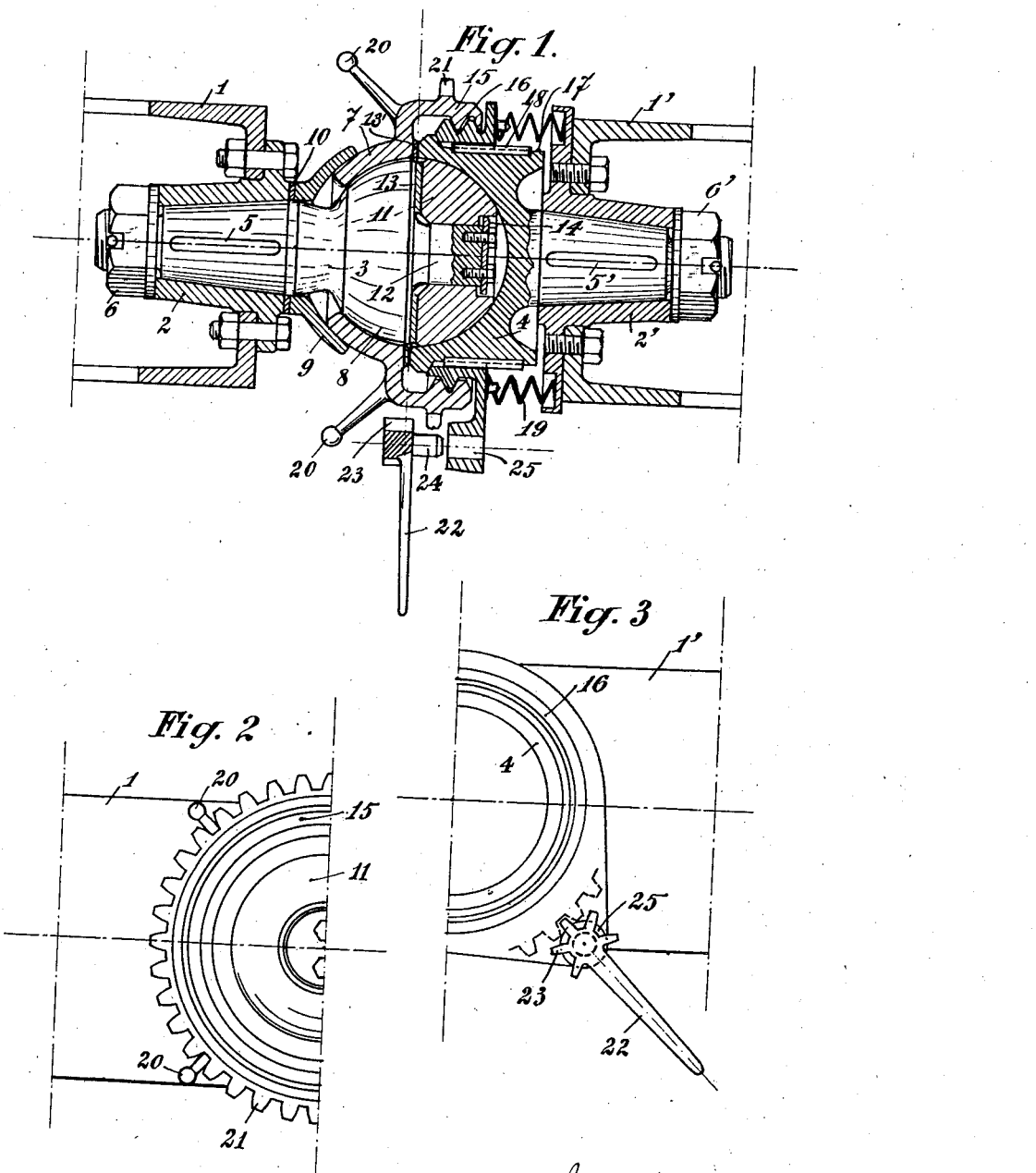

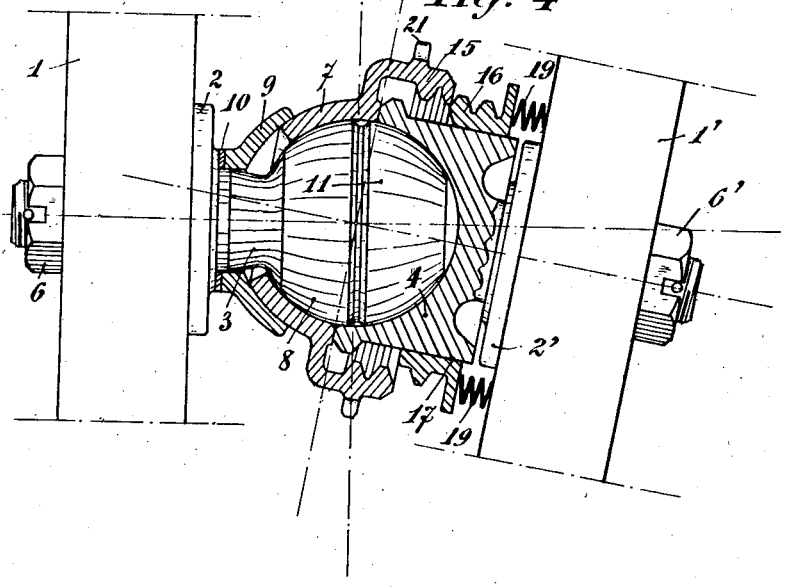
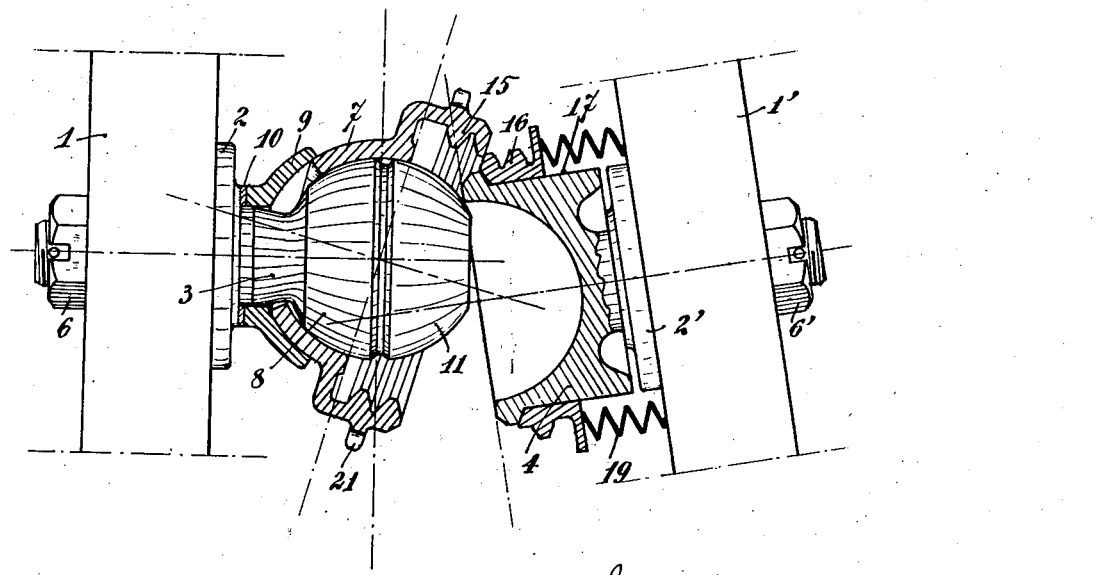

Inventor:-
Ettore Bugatti
By Mauro & Lewis,
Attorneys

Patented May 28, 1940

2,202,753

UNITED STATES PATENT OFFICE 2,202,753

COUPLING APPARATUS FOR VEHICLES

Ettore Bugatti, Molsheim, France

Application November 22, 1937, Serial No. 175,968
In France November 25, 1936

13 Claims. (Cl. 213—75)

The present invention has for its object a semi-automatic coupling apparatus of the kind including a universal joint made in the form of a ball fitted in a socket. This apparatus is intended to provide a connection between two vehicles of any kind whatever, for instance two road vehicles, such as a tractor and a trailer, two vehicles running on guideways, such as railway vehicles, etc. As a rule, the application to railway vehicles is the most important one.

It has already been endeavoured to provide means enabling of easily separating two vehicles assembled together by a coupling device including a ball and a socket. As far as I am aware, all of the solutions suggested up to the present time derive from a common idea: that of constituting the socket in two parts adapted to be separated from each other, which are assembled in a meridian plane with respect to the ball and on either side respectively of such a plane, the latter being further horizontally disposed. Thus, for instance, it has been suggested to arrange the two socket elements above one another, in the same manner as if they constituted jaws intended to catch the ball between them. In this case, these jaws were two pieces adapted to be wholly separated from each other and were secured by means of lugs to one of the vehicles, their tightening on the ball being ensured by vertical bolts. In another case, one of the branches was fixed to one of the vehicles and the other one was hingedly mounted thereon. The movement of these branches toward each other was controlled by an operating handle.

These known coupling apparatus are not easy to manipulate because they do not permit of letting the two vehicles strike each other when they are brought together for being coupled without the elements of the coupling device risking serious injury as a consequence of the shock and they necessitate delicate handling because the ball must be brought exactly opposite the two socket elements. These apparatus also have the serious drawback of compelling the fastening means of the two elements of the socket to work under bad conditions. Finally, the first of those above mentioned has the drawback of including parts which are wholly removable, that is to say liable to be lost.

The apparatus according to the present invention has been devised in order to obviate the drawbacks above mentioned. This apparatus includes, like the known apparatus, two parts adapted to be separated from each other and which are fixed to each other for obtaining the coupling and detached from each other for uncoupling, but it is characterized by the following essential feature: The plane of the joint, instead of passing through the axis of the ball rod or of being, more generally, arranged in the longitudinal direction with respect to the vehicles, is disposed perpendicularly to the longitudinal axis of one of the vehicles, and one of the detachable parts is carried by said vehicle in such manner as to lie in an axial direction, whereas the other part is connected to that of the two elements of the universal joint (ball or socket) which can have displacements in all directions with respect to the second vehicle, the other element being carried by the second vehicle.

It will be readily understood that, owing to the arrangement above described, the operations of coupling together and separating the two vehicles are facilitated since one of the two complementary parts can be displaced at will so that it is easy to cause it to come into correct relative position with respect to the other part for assembling them together. Furthermore, it will be understood that, as a consequence of the fact that the first named part is movable in all directions, it is possible to obtain, through the arrangement of suitable guides, that said part may come spontaneously, that is to say without any manual action, into the correct position for its assembling with the other part when the vehicles are moved toward each other. Finally, for the same reason, the complementary parts may be fitted with corresponding members such that the assembly is effected by merely revolving the part movable in all directions about an axis passing through the center of the ball.

The remarks above set forth stress the fact that there is a great number of practical embodiments of the coupling device above described, all these embodiments remaining within the scope of the present invention.

I will merely describe hereinafter an embodiment which is particularly simple and has many practical advantages. In this embodiment, the two complementary parts of the coupling device include, one, a half socket carried by one of the vehicles, and the other a half-socket mounted on the ball and without a polar cap or segment so as to permit the passage of the rod for the fixation of this ball, which rod is carried by the other vehicle, the two half-sockets extending over at most one hemisphere. Under these conditions, the most salient part of the vehicle may be the corresponding half-socket which constitutes a kind of centre-casting provided at the end of a support and the most salient part of the other vehicle is the polar part of the ball that is opposed to the polar portion covered by the second half-socket. With such an arrangement, if the vehicles are moved toward each other in such manner that these pieces come into contact, without necessarily being exactly in the respective positions corresponding to their fitting exactly into each other, the reaction between the ball and the centre-casting has for its effect to deviate the movement of one of the vehicles or of both and to produce (if the arrangement allows it) a displacement of the part carrying the ball and/or of the part carrying the center-casting, until both complementary parts fit exactly in each other. In other words, it is possible to dispense with the provision of special guides for moving into correct relative positions the two pieces to assemble.

Furthermore, as soon as the ball penetrates into the centre-casting, the edges of the latter come into contact with the half-socket permanently retained on this ball, thus automatically producing the correct positioning of the parts with respect to each other for assembly.

The obtainment of these results, which comes from the particular principle of the apparatus is extremely useful for practical purposes, because it renders the operations of coupling and uncoupling vehicles extremely rapid in spite of the fact that, even with railway vehicles guided as railway vehicles are by the rails upon which they run (and a fortiori with road vehicles) the heights of the respective parts of the coupling device on two vehicles are never exactly the same and the longitudinal axes of these vehicles, before their coupling, generally do not intersect each other at the centre of the ball.

The assembly of the two separable parts may be obtained through any suitable means and especially through so-called quick assembling means. In particular, I may make use of means involving, for the assembling or the detaching of the parts, a relative rotation of the two pieces since one of the parts can turn on the ball. Such means consist, for instance, of screw threads, inclined surface elements, bayonet joint elements. The parts in question may be provided with screw threads formed directly therein. The part capable of turning with respect to the ball may be provided with operating levers or handles and/or teeth permitting its rotation by means of a pinion wrench which is for instance temporarily or permanently supported by the other part of the coupling device.

In the preferred embodiment of the invention, the assembling is effected, not directly between the two parts adapted to be separated from each other, but between one of said parts and an element capable of being elastically retracted when said parts come into contact with each other, and which is however connected to the other part. For instance, considering as a concrete example, that in which the two parts capable of being separated from each other are the two half-sockets above mentioned, the retractable element may consist of a sliding member connected through ribs or in any other equivalent way with the center-casting, this sliding member being threaded so as to be in mesh with a nut rigid with the half-socket movable with respect to the ball. Of course, any equivalent arrangement may be employed and, in particular, the elastically retractable element may be a sliding nut carried by the movable half-socket and adapted to screw on the centre-casting, or again a sliding nut carried by the centre-casting and in which the movable half-socket screws, or again a sleeve provided with outward threads, carried by the movable half-socket in such manner as to be able to slide with respect thereto and adapted to screw in a stationary nut secured to the centre-casting.

An additional feature of the invention, which is applicable to all embodiments of the apparatus above set forth, in a general manner, but which is more especially adapted for use in connection with the preferred embodiment (that in which the movable connection is provided between two half-sockets) is that hereinafter described and intended to eliminate axial play between the ball and the socket that surrounds it. According to a first embodiment of this feature, the ball is divided into two parts at least, by cutting it perpendicularly to the diameter extending in the direction of the longitudinal axis of the corresponding vehicle and by interposing between the two adjacent portions of the sphere thus obtained an elastic element, for instance a strong spring (Belleville) washer or a coil spring. For practical purposes, it suffices to cut the ball into only two parts, along a meridian plane. The sphere portions are thus elastically applied with a considerable strength against the inner walls of the socket.

According to a second embodiment of this feature, which does not exclude the simultaneous application of the first, elastic means corresponding to those just above mentioned are interposed in a similar manner between two portions of the socket assembled to each other along a plane perpendicular to the longitudinal axis of the vehicle carrying the ball, for instance between the two half-sockets in the preferred embodiment above disclosed.

The coupling device above set forth and which constitutes the object of the invention may be combined with elastic shock or traction means instead of having its end parts rigidly fixed to the two vehicles and/or to shoe-and-slideway systems capable of giving it the desired mobility with respect to the vehicles.

Other features of the present invention will result from the following detailed description of some specific embodiments thereof.

Preferred embodiments of the present invention will be hereinafter described, with reference to the accompanying drawings, given merely by way of example, and in which:

Fig. 1 is a longitudinal sectional view, in a vertical plane, of the whole of the apparatus in operative position, that is to say with the parts assembled together;

Fig. 2 is a part end view showing the left hand side part of the apparatus of Fig. 1;

Fig. 3 is an analogous view showing the right hand side part thereof;

Fig. 4 is a plan view of the whole apparatus, the chief elements being shown in section, this view showing that the relative position of the sliding screw which has been moved backward by the tightening nut remains correct even if the angle between the respective axes of the vehicles to be coupled together is large;

Fig. 5 is a view analogous to the preceding one illustrating the beginning of the coupling operation and the correct working of the whole of the apparatus even when the vehicles are moved toward each other under very bad conditions;

Figure 6:
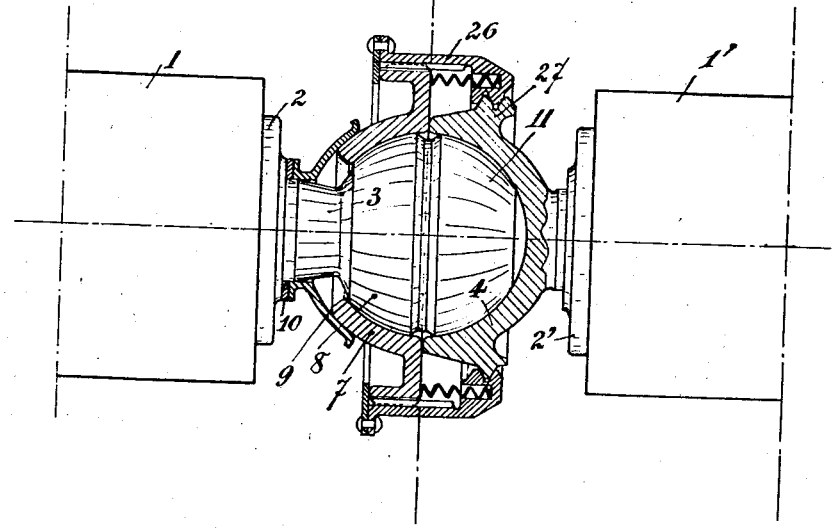
Fig. 6 is a view, similar to Fig. 1, showing another embodiment of the invention.

In the appended drawings, the frames of the vehicles to be coupled together (or to be more accurate the end cross members thereof) are designated by reference characters 1 and 1'. Supports 2 and 2' are fixed on the frame in any suitable manner (either rigidly or elastically, or again with transverse mobility). One of them carries ball 3, the other the hemispherical center-casting 4, these two elements being for instance secured by keys 5 and 5' and nuts 6 and 6'.

A cover or half-socket 7, which constitutes, together with center-casting 4, a ball box in two parts, surrounds the portion 8 of the ball and it is retained on the ball 3 by a bowl or cup 9. Elastic means may be interposed between parts 4 and 7, for instance in the form of a liner 13' on the end face of cover 7 as illustrated on Fig. 1.

This cup is, preferably, slightly elastic or elastically applied against support 2, owing to the provision of an elastic cushion 10, so as to exert a slight pressure on cover 7, or to permit a small axial displacement thereof.

The portion 11 of the sphere is centered on a pin 12 carried by ball 3. Between portions 8 and 11, there is provided a strong annular spring 13 in order to apply these portions strongly against their housings in pieces 4 and 7. An annular element 14 or the like, fixed on pin 12 is positioned to retain portion 11.

The means for assembling together the two socket sections, which means enable of coupling two vehicles with each other, are, in the case of Figs. 1 to 5, a nut 15 rigid with the box cover 7 and a sliding screw 16 adapted to slide in the direction of its axis along a cylindrical bearing 17 integral with centre-casting 4 or secured thereon. Keys 18 or equivalent means prevent rotation of screw 16 with respect to its bearing 17.

Springs 19, held through any suitable means between support 2' or frame 1', or against a stop of centre-casting 4, and a face of sliding screw 16, urge the latter toward its operative position (Figs. 1 and 5) while enabling it to be retracted by nut 15, when the two vehicles come into contact prior to their being coupled to each other, as shown by Fig. 4.

Owing to the provision of springs 19 and to the particular arrangement of screw 16, it is also possible to separate from each other two vehicles coupled by the apparatus according to the invention without it being necessary to modify their relative positions during the detaching operation.

In order to permit quick coupling and uncoupling nut 15 is provided with handles 20 distributed over its periphery. In order to enable of finishing the coupling operation by a strong tightening and also to enable of readily effecting the uncoupling (especially when one of the vehicles is pulling the other through the apparatus when the vehicles are to be separated) the nut is provided on its periphery with strong teeth 21. A wrench or spanner consisting of a handle 22 and a pinion having a relatively small number of teeth 23 is engaged by means of a journal 24 into a cylindrical hole 25 provided in screw 16, in such manner that teeth 23 come into contact with teeth 21. I thus obtain a couple of gears cooperating together with a high gear ratio.

In the case of Fig. 6, the tightening nut 26 is mounted in such manner as to be able to slide axially on the cover 7 of the ball box, whereas screw 27 is rigid with centre-casting 4.

Figure 7:
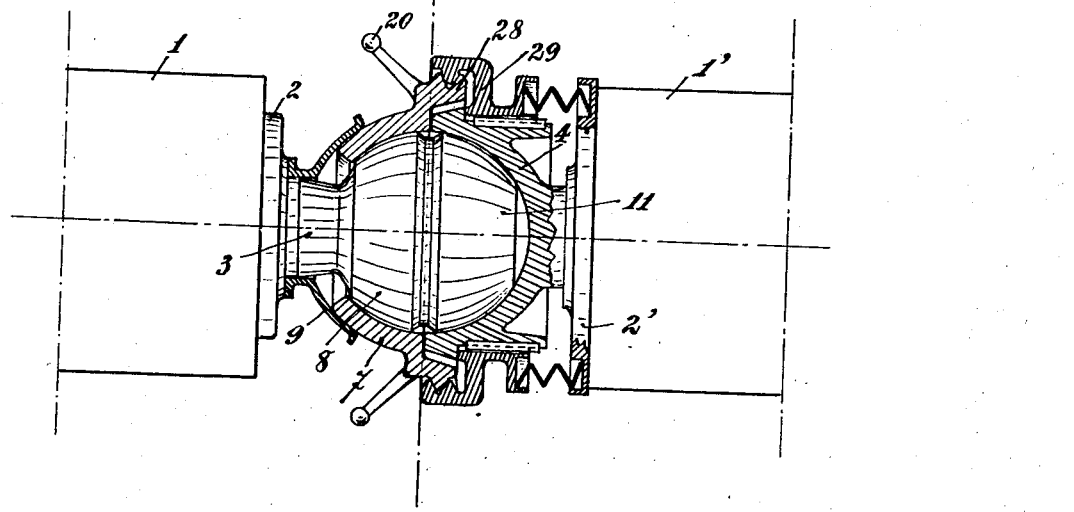
Fig. 7 is a view similar to Fig. 1, showing still another embodiment.

Fig. 7 illustrates the case in which the tightening screw 28 is rigid with the cover 7 of the ball box and nut 29 is mounted in such manner as to be able to slide axially with respect to the centre-casting 4.

It should be well understood that, instead of the screw and nut system illustrated by the drawings, I might use any other suitable assembling means for the two halves of the ball box. In a likewise manner, any suitable tightening device might be used instead of that disclosed by Figs. 1 to 5.

Finally, for practical purposes, the apparatus is completed by a device for locking in service position the means for assembling together the elements of the ball box.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A semi-automatic coupling device for assembling two vehicles together, which comprises, in combination, a part of a spherical socket carried by one of said vehicles, a spherical ball carried by the other vehicle adapted to fit in said socket so as to cooperate therewith, another part of said spherical socket fitted on said ball and slidable in all directions thereon, said second socket part being adapted to complete the first mentioned socket part by assembling therewith along a plane at right angles to the longitudinal axis of the first mentioned vehicle, whereby said ball is surrounded by these two socket parts assembled together, a member carried slidably in the axial direction by one of said socket parts but angularly fixed with respect thereto, and cooperating fixation means carried by said member and the other socket part respectively for detachably securing said socket parts together, said fixation means being operative by rotation of the said second mentioned socket part with respect to the other socket part.

2. A coupling device according to claim 1 in which said cooperating fixation means constitute a screw and nut system.

3. A coupling device according to claim 1 further including operating levers carried by said second mentioned spherical socket part and effort multiplying means associated with the second socket and said member for facilitating the assembly of said socket parts with each other.

4. A coupling device according to claim 1 including a longitudinal spindle for connecting said spherical ball with said second mentioned vehicle, said second mentioned socket part being provided with a polar hole for the passage of said spindle therethrough.

5. A coupling device according to claim 1 in which said fixation means include a screw carried by said sliding member and a nut cooperating with said screw and carried by the socket part which does not carry said sliding member, and spring means for urging the sliding member with the screw carried thereby toward the nut.

6. A semi-automatic coupling device for assembling two vehicles together, which comprises, in combination, a part of a spherical socket carried by one of said vehicles, a ball carried by the other vehicle adapted to fit in said socket so as to cooperate therewith, the ball being made of at least two portions assembled to each other along a surface at right angles to the diameter of said ball which is parallel to the longitudinal axis of the vehicle by which it is carried and elastic means interposed between said ball portions, another part of said spherical socket fitting on said ball and slidable in all directions thereon, said second socket part being adapted to complete the first mentioned socket part by assembling therewith along a plane at right angles to the longitudinal axis of the first mentioned vehicle, whereby said ball is surrounded by these two socket parts assembled together, and means, operative by rotation of the second socket part with respect to the first about an axis passing through the center of said ball, for detachably securing said two socket parts to each other.

7. In a ball and socket coupling device for vehicles having a ball on one vehicle, a socket section on the other vehicle adapted to cap the adjacent portion of the ball, and a complementary socket section retained on the ball, adapted to be coupled with the first socket section, to form a ball encasing socket, the combination with one of the socket sections of an exposed member which is resiliently mounted on the said socket section for longitudinal movement with respect thereto and is adapted to abut the other section prior to the abutting of the adjacent faces of the two socket sections.

8. In a ball and socket coupling device including two separable socket sections, the combination with one of the socket sections having an abutment thereon of a member for coupling said section with the companion socket section, said coupling member being slidably mounted on the first named section and positioned with respect to the abutment so as to be movable away from the companion socket section but to have its movement toward the said companion section limited by said abutment.

9. The combination of claim 8, further comprising resilient means to urge the coupling member against the abutment.

10. In a ball and socket coupling device including two separable socket sections, the combination with one of the socket sections having an abutment thereon, of an annular coupling member slidably mounted on said section for longitudinal movement thereon and positioned on said section on the side away from the companion socket section with respect to the abutment, and cooperating means on the first-named section and the coupling member to hold the latter against rotation on the former while allowing said sliding longitudinal movement of said member on said first named section, the coupling member and the companion socket section having corresponding screw-threads to enable coupling by relative rotation of the two socket sections.

11. The combination of claim 8, further including a compressible liner operatively inserted between the adjacent surfaces of the separable socket sections.

12. The combination of claim 8, the ball being split into two portions in a plane parallel to the adjacent surfaces of the separable socket sections, and an elastic liner interposed between the split ball portions.

13. In a ball and socket coupling device including two separable socket sections, the combination with one of the socket sections having an abutment thereon, of an annular coupling member slidably mounted on said section for longitudinal movement thereon and positioned on said section on the side away from the companion socket section with respect to the abutment, the coupling member and the companion socket section having corresponding screw-threads to enable coupling by relative rotation of the two socket sections; cooperating means on the first-named section and the coupling member to hold the latter against rotation on the former while allowing said sliding longitudinal movement of said member on said first named section; and an effort multiplying device for relatively rotating the coupling member and the said companion socket section, which device includes a driving part and a driven part adapted to cooperate with the driving part, one of said parts being mounted on the coupling member and the other part on the said companion socket section.

ETTORE BUGATTI.